United States Patent

[11] 3,578,988

[72] Inventor Daniel F. Slowikowski
Newport News, Va.

[21] Appl. No. 874,732
[22] Filed Nov. 7, 1969
[45] Patented May 18, 1971
[73] Assignee The United States of America as represented by the Administrator of the National Aeronautics and Space Administration

[54] DIGITAL PULSE WIDTH SELECTION CIRCUIT
5 Claims, 2 Drawing Figs.

[52] U.S. Cl. .......... 307/265, 307/215, 307/247, 307/273, 307/294, 328/207
[51] Int. Cl. .......... H03k 1/18
[50] Field of Search .......... 307/215, 265, 247, 273, 294; 328/207

[56] References Cited

UNITED STATES PATENTS

| | | | |
|---|---|---|---|
| 3,078,371 | 2/1963 | Mobring | 307/273X |
| 3,227,891 | 1/1966 | Ashcraft | 307/273X |
| 3,274,399 | 9/1966 | Sheng | 307/273 |
| 3,436,682 | 4/1969 | Birnbaum | 307/273X |
| 3,517,220 | 6/1970 | Gibson et al. | 307/273 |

*Primary Examiner*—John S. Heyman
*Assistant Examiner*—R. C. Woodbridge
*Attorneys*—Howard J. Osborn, William H. King and G. T. McCoy

ABSTRACT: A device that will produce different width pulses. The width of the pulse produced at any given time is selected by a digital input. The digital input selects one of two or more possible timing circuits for a one-shot multivibrator. Hence, the digital input selects one of two or more possible pulse widths capable of being produced by the multivibrator.

Patented May 18, 1971

3,578,988

2 Sheets-Sheet 1

INVENTOR.
DANIEL F. SLOWIKOWSKI
BY
William H. King
ATTORNEYS

INVENTOR.
DANIEL F. SLOWIKOWSKI
BY
William H. King
ATTORNEYS

DIGITAL PULSE WIDTH SELECTION CIRCUIT

ORIGIN OF THE INVENTION

The invention described herein was made by an employee of the United States Government and may be manufactured and used by or for the government for governmental purposes without the payment of any royalties thereon or therefore.

BACKGROUND OF THE INVENTION

The invention relates generally to a circuit for producing different width pulses and more specifically concerns a circuit for producing different width pulses that can be selected by digital signals.

In the prior art, different width pulses are produced by varying the timing circuit in a one-shot multivibrator thereby changing the width of the pulses at the output of the multivibrator. This is done by using relays or switches to remotely vary either the resistance, capacitance, or driving voltage of the timing circuit. Since the length of the connecting lines from the relays or switches to the timing circuits affects the timing circuit and hence the pulse widths, and since the timing circuit is highly susceptible to noise, it is extremely important that the lengths of the connecting lines between the relays or switches and the timing circuit be minimized. To achieve this minimization of length the system designer is usually presented with the problem of either mounting a nonstandard module within a tray or motherboard designed to accept only standard modules or mounting the standard one-shot multivibrator in a nonstandard fashion. The primary purpose of this invention is to provide a circuit, using only standard modules for producing different width pulses that can be selected by digital signals.

SUMMARY OF THE INVENTION

The invention includes a one-shot multivibrator with a first capacitor in its timing circuit. Each time a trigger pulse is applied to the multivibrator, a pulse whose width is proportional to the capacitance of the first capacitor is produced at a first of its outputs. The inverse of the first output is produced at a second output of the multivibrator. That is, the second output is the logical inverse of the first output. The second output is applied to one of the inputs of a NAND gate. The output of the NAND gate is applied to a second capacitor which is connected in such a manner that when the NAND gate is producing a logical "0" at the time the trigger pulse is applied, the second capacitor is connected in parallel with the first capacitor and when the NAND gate is producing a logical "1" at the time the trigger is applied, the second capacitor is not connected in the timing circuit. Hence, when a trigger pulse is applied to the multivibrator, if a logical "1" is applied to the other input of the NAND gate a pulse is produced whose width is proportional to the capacitance of the first capacitor and if a logical "0" is applied to the other input of the NAND gate a pulse is produced whose width is proportional to the capacitance of the first capacitor plus the capacitance of the second capacitor. Consequently, the digital signals at the other input to the NAND gate can select either of two pulses having different widths. This invention can be expanded, as shown in one of the embodiments of the invention, to select one of any number of different width pulses.

DETAILED DESCRIPTION OF THE INVENTION

Figure 1:
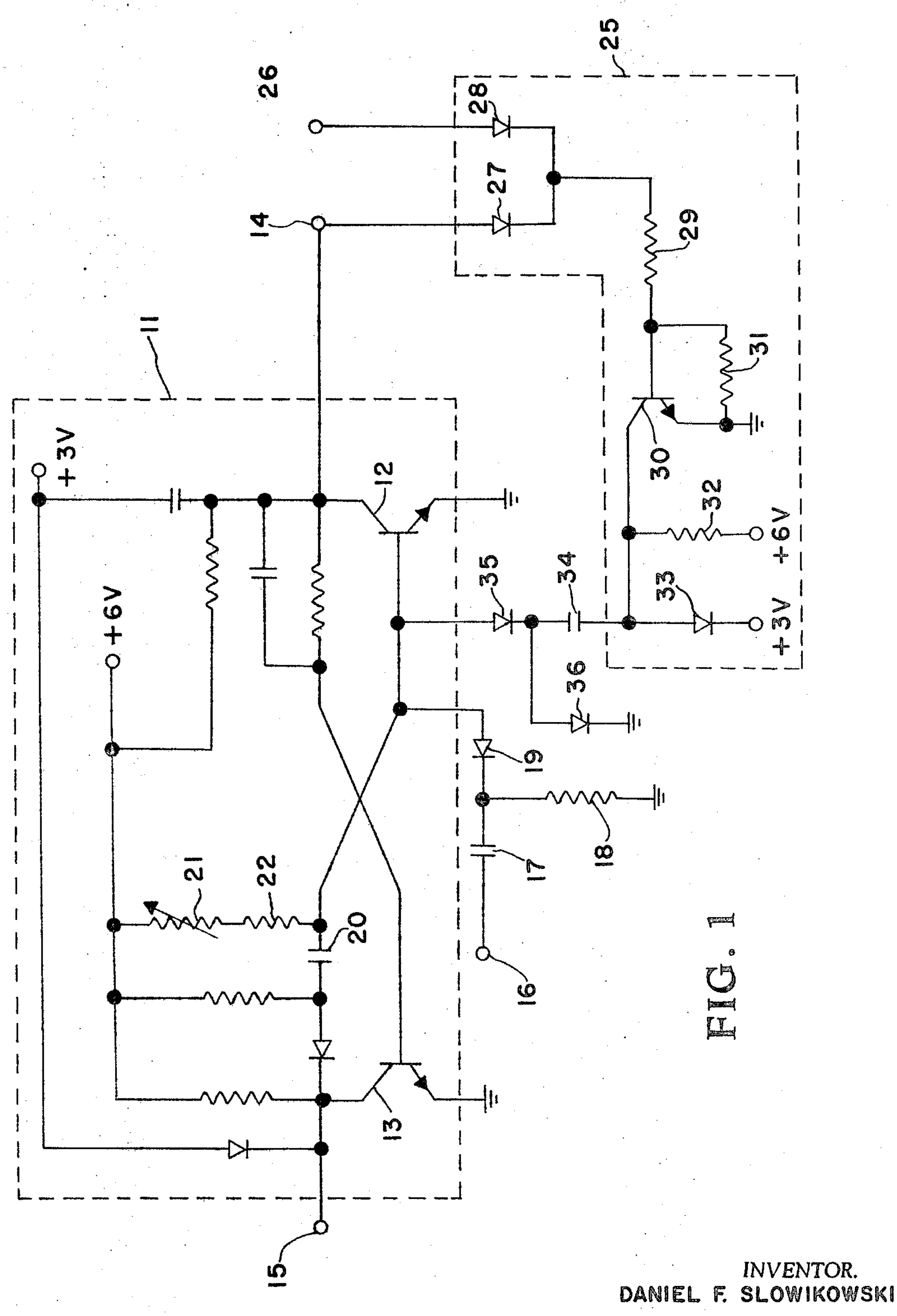
FIG. 1 is a schematic drawing of an embodiment of the invention in which one of two different width pulses can be selected.

Turning now to the embodiment of the invention selected for illustration in FIG. 1 of the drawing the number 11 designates a one-shot multivibrator. Transistor 12 is normally conducting and transistor 13 is normally not conducting. Hence terminal 14 is normally at zero volts and terminal 15 is normally at pulse 3 volts. When a negative trigger pulse is applied to the terminal 16 it is shaped by a differentiating circuit consisting of a capacitor 17 and a resistor 18 and then applied through a diode 19 to the base of transistor 12. This causes transistor 12 to stop conducting and transistor 13 to start conducting. Consequently, terminal 14 goes to pulse 3 volts, terminal 15 goes to zero volts and capacitor 20 starts charging through resistors 21 and 22. As capacitor 20 charges the potential at the base of transistor 12 rises until the transistor again becomes conductive. Capacitor 20 and resistors 21 and 22 constitute the timing circuit for multivibrator 11 and hence determines the width of the pulses produced at terminals 14 and 15. The width of these pulses is 0.692 $(R_1+R_2)\ C_1$ where $R_1$ is the resistance of resistor 22 and $C_1$ is the capacitance of capacitor 20.

The number 25 designates a NAND gate. The input terminals 14 and 26 of NAND gate 25 are connected through diodes 27 and 28, respectively, and then through a resistor 29 to the base of a transistor 30. The base of transistors 30 is connected through a resistor 31 to the emitter of transistor 30 which is grounded. The collector of transistor 30 is connected through a resistor 32 to a pulse 6 volt power supply. The collector of transistor 30, which is the output of gate 25, is the NAND function of the two inputs to the gate. Assume that pulse 3 volts is the logical "0" and that zero volts is the logical "1."Then if zero volts (logical "1"). is applied to both terminal 14 and terminal 26, transistor 30 is not conducting and the output of gate 25 is plus 3 volts (logical "0"). If pulse 3 volts is applied to either terminal 14 or 26, transistor 30 becomes conductive and the output of gate 25 is at zero volts (logical "! ").

The output of gate 25 is applied through capacitor 34 and diode 35 to the base of transistor 12. The junction of capacitor 34 and diode 35 is connected to ground through a diode 36. The purpose of diode 36 is to allow capacitor 34 to discharge to ground when the output of gate 25 undergoes a voltage transition from zero to plus 3 volts.

In the operation of the embodiment of the invention disclosed in FIG. 1, assume that plus 3 volts is applied to input terminal 26. Then the output of NAND gate 25 is held at zero volts regardless of the voltage at terminal 14 since the 3 volts at terminal 26 make transistor 30 conductive and connects the output of gate 25 to ground. This zero volts at the output of gate 25 causes diode 35 to be back biased. Hence, while transistor 12 is conductive and a pulse is being generated at output terminal 15, capacitor 34 does not affect the timing circuit of multivibrator 11. Therefore the pulse width is 0.692 $(R_1+R)\ C_1$. Now assume that zero volts is applied to input terminal 26 and a trigger pulse is applied to terminal 16. Transistor 12 becomes nonconductive which causes terminal 14 to go to plus 3 volts. Hence, transistor 30 becomes conductive and the output of NAND gate 25 undergoes a voltage transistor from plus 3 volts to zero volts. Diode 35 is thus forward biased and capacitor 34 is placed effectively in parallel with capacitor 20. Therefore, the width of the pulse generated at output terminal 15 is equal to 0.692 $(R_1+R_2)\ (C_1+C_2)$where $C_2$ is the capacitance of capacitor 34. Consequently, either of two width pulses can be generated at output terminal 15 depending on the digital input applied to terminal 26.

Figure 2:
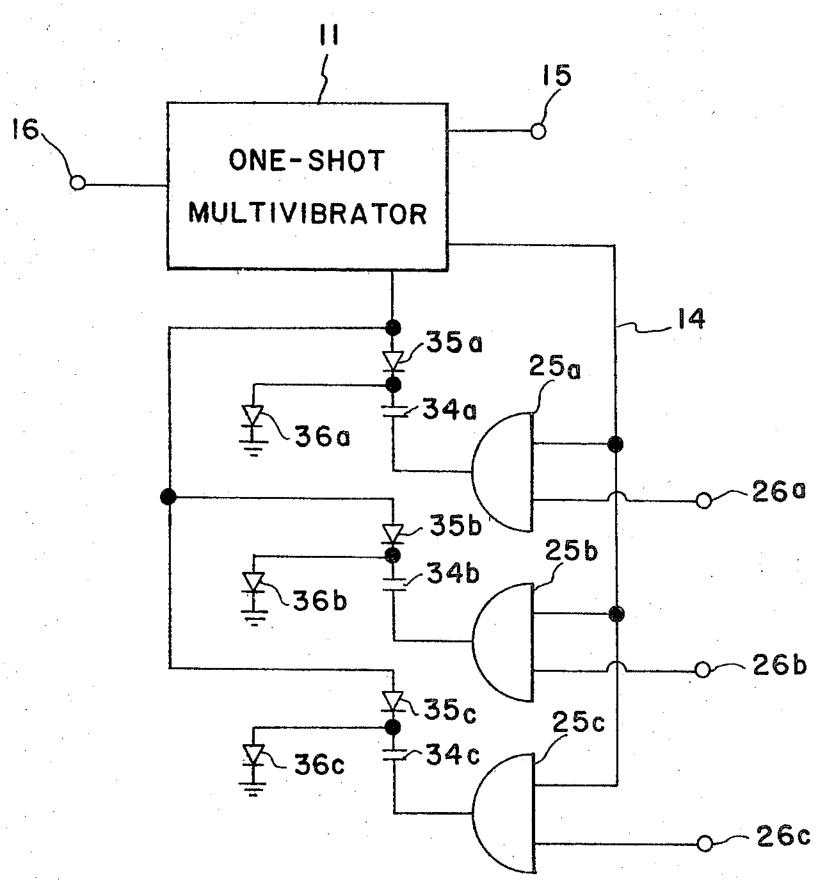
FIG. 2 is a drawing of an embodiment of the invention in which one of eight different width pulses can be selected.

Referring now to FIG. 2, there is shown an embodiment of the invention in which three digital control lines are used instead of one. Each of the feedback circuits to multivibrator 11 is the same as the one shown in FIG. 1 except the capacitors are different. Therefore by applying digital signals to terminals *26a*, *26b* and *26c*, eight different pulse widths can be generated at output terminal 15. These digital signals are applied to NAND gates *25a*, *25b* and *25c* which are identical to NAND gate 25 in FIG. 1. Theoretically, any number of control lines can be used to affect the conversion of any digital code to a pulse width or pulse duration code.

This invention has the advantage that it allows remote pulse width selection without requiring the use of nonstandard modules. Thus, all required logic can be mounted on standard trays or motherboards. This eliminates the need for special mounting devices and allows true minimization of noise-sensitive interconnections.

I claim:

1. A circuit for generating a selected one of two different width pulses comprising: a one-shot multivibrator including an input for applying a trigger pulse, a first output, a second output at which is produced a signal that represents a logical "0" while a pulse is being generated at said first output and at which is produced a signal representing a logical "1" while a pulse is not being generated at said first output, and a timing circuit for determining the widths of the pulse generated by the multivibrator at the first output; a NAND gate having two inputs with one input connected to said second output of the multivibrator and an output; and means connected to the output of said NAND gate for changing said timing circuit if and only if the output of the NAND gate is a logical "0" at the time the trigger pulse is applied whereby if a signal representing a logical "1" is applied to the other input of said NAND gate at the time a trigger pulse is applied to the input of said multivibrator a pulse having one width is generated at the first output of said multivibrator and if a signal representing a logical "0" is applied to the other input of said NAND gate at the time a trigger pulse is applied to the input of said multivibrator a pulse having another width is generated at the first output of said multivibrator.

2. A circuit according to claim 1 wherein said means connected to the output of said NAND gate includes a capacitor that is connected in parallel with the capacitance of said timing circuit if the output of said NAND gate is a logical "0" at the time the trigger pulse is applied and that is not connected to the timing circuit if the output of said NAND gate is a logical "1" at the time the trigger pulse is applied.

3. A circuit according to claim 1 wherein one of $2^n$ different width pulses can be selected by connecting $n$ of the NAND gates and the means connected to the output of the NAND gate in parallel in the feedback circuit of the multivibrator.

4. A circuit according to claim 1 wherein said NAND gate includes a transistor that matches a transistor in said multivibrator that conducts while a pulse is being generated at said first output.

5. A circuit for generating a selected one of two different width pulses comprising: a one-shot multivibrator including a input for applying a trigger pulse, a first output, a second output at which is produced a signal that represents a logical "0" while a pulse is being generated at said first output and at which is produced a signal representing a logical "1" while a pulse is not being generated at said first output, and a timing circuit for determining the width of the pulse generated by the multivibrator at the first output; means including a NAND gate connected between said second output and said timing circuit for changing said timing circuit when a signal representing a logical "1" is applied to said NAND gate and for leaving said timing circuit the same when a signal representing logical "0" is applied to said NAND gate whereby said multivibrator generates at its said first output one of two possible width pulses as determined by the signal applied to said NAND gate.